(12) United States Patent
Lewis

(10) Patent No.: US 7,537,412 B2
(45) Date of Patent: May 26, 2009

(54) BREAKAWAY SIGNPOST

(76) Inventor: Donald G. Lewis, 2452 White Mills Glendale Rd. West, Glendale, KY (US) 42740

(*) Notice: Subject to any disclaimer, the term of this patent is extended or adjusted under 35 U.S.C. 154(b) by 0 days.

(21) Appl. No.: 11/704,887

(22) Filed: Feb. 9, 2007

(65) Prior Publication Data

US 2008/0193200 A1    Aug. 14, 2008

(51) Int. Cl.
*E01F 9/018* (2006.01)
(52) U.S. Cl. .......................... 404/10; 404/9; 40/606.01; 40/607.1; 40/612
(58) Field of Classification Search ............ 40/606.01, 40/607.1, 607.11, 612; 404/9, 10; 248/218.4, 248/219.1, 219.3, 548; 403/2
See application file for complete search history.

(56) References Cited

U.S. PATENT DOCUMENTS

| | | | | |
|---|---|---|---|---|
| 1,677,796 A | * | 7/1928 | Parks .......................... 248/548 |
| 4,071,970 A | | 2/1978 | Strizki |
| 4,126,403 A | * | 11/1978 | Sweeney et al. ................ 403/2 |
| 4,607,824 A | | 8/1986 | Krage et al. |
| 4,784,515 A | | 11/1988 | Krage et al. |
| 4,926,592 A | | 5/1990 | Nehls |
| 5,481,835 A | | 1/1996 | Bloom |
| 5,503,495 A | * | 4/1996 | Mak et al. ....................... 404/6 |
| D389,252 S | * | 1/1998 | Alberson et al. ........... D25/133 |
| D389,253 S | * | 1/1998 | Alberson et al. ........... D25/133 |
| 5,988,598 A | * | 11/1999 | Sicking et al. .............. 256/13.1 |
| 6,129,342 A | | 10/2000 | Bronstad |
| 6,254,063 B1 | * | 7/2001 | Rohde et al. ................ 256/13.1 |
| 6,279,288 B1 | * | 8/2001 | Keil ........................... 52/653.2 |
| 6,398,192 B1 | | 6/2002 | Albritton |
| 6,409,156 B2 | * | 6/2002 | Dent .......................... 256/13.1 |
| 6,422,783 B1 | | 7/2002 | Jordan |
| 6,488,268 B1 | | 12/2002 | Albritton |
| 6,540,196 B1 | | 4/2003 | Ellsworth |
| 6,793,204 B2 | | 9/2004 | Albritton |
| 6,868,641 B2 | * | 3/2005 | Conner et al. .................. 52/98 |
| 6,886,813 B2 | | 5/2005 | Albritton |
| 2002/0122693 A1 | | 9/2002 | Jordan |

* cited by examiner

*Primary Examiner*—Gary S Hartmann
(74) *Attorney, Agent, or Firm*—Carrithers Law Office, PLLC; David W. Carrithers

(57) ABSTRACT

A sectional I-beam post for use along a roadside in which the post has a first elongate lower section securable via a first slip type coupling to a base anchored in the ground. Slip movement of such coupling is in a direction across the length of the post. The first coupling includes L-shaped brackets with one leg thereof attached to the post by bolts so as to be detachable therefrom and notches in the outer end of the other leg which projects outwardly from the post. A second elongate upper post section has the lower end thereof connected to the upper end of the first post section by a second slip type coupling. Slip movement of the second coupling is in a direction lengthwise of the post. The second coupling includes plates bolted to one post section and having notches that provide a slip connection with the other post section.

4 Claims, 2 Drawing Sheets

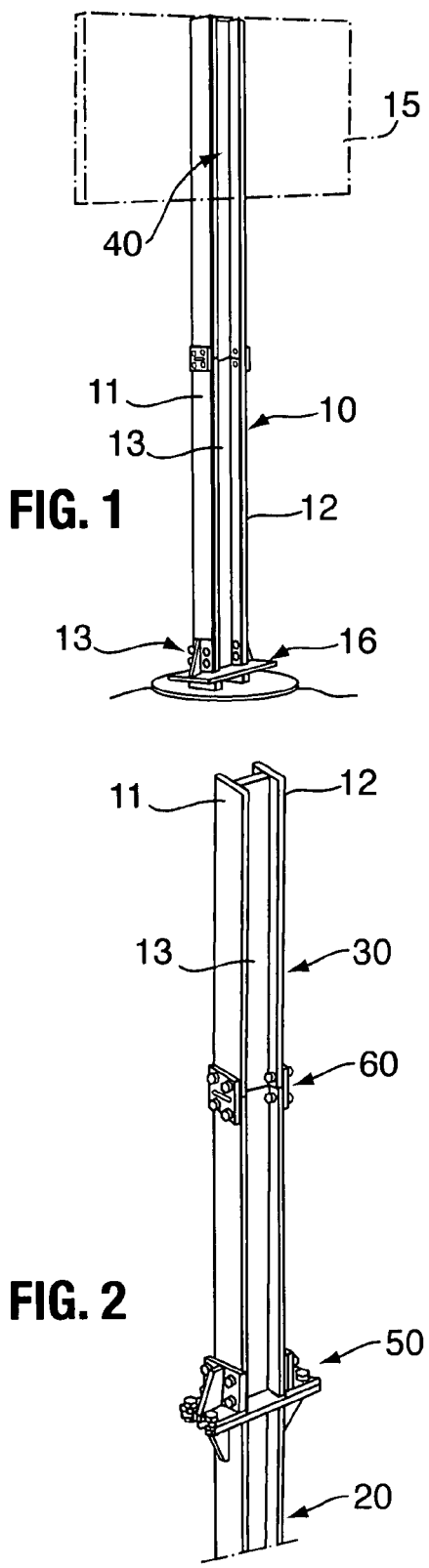
FIG. 1
FIG. 2
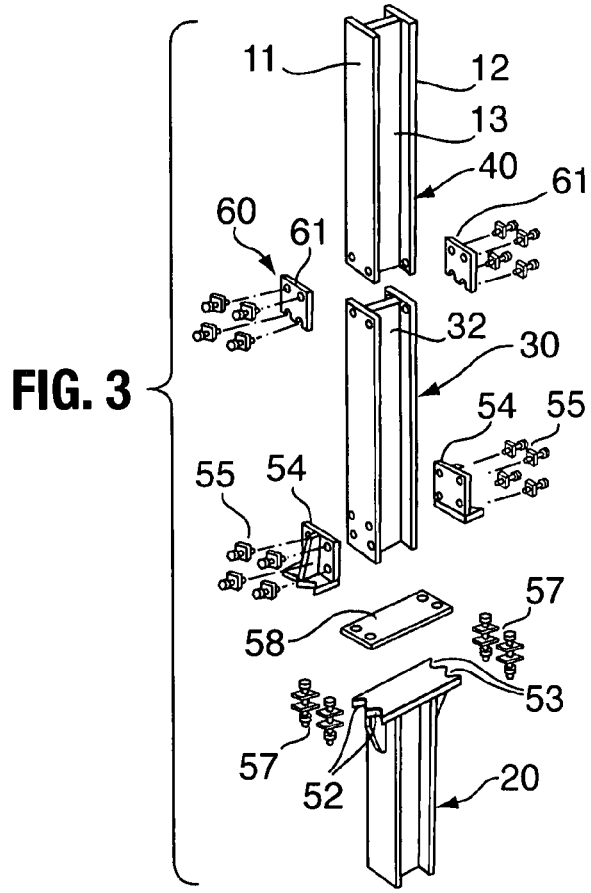
FIG. 3
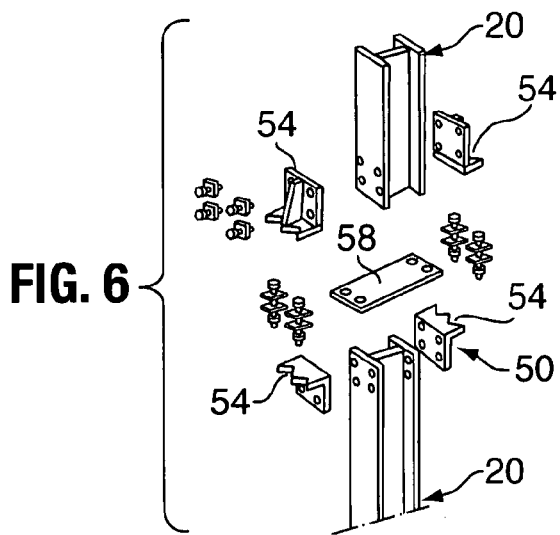
FIG. 6

BREAKAWAY SIGNPOST

TECHNICAL FIELD OF THE INVENTION

This invention relates generally to a breakaway coupling interconnecting adjacent post sections including hinge, pivot and slip type couplings.

BACKGROUND OF INVENTION

Description of the Prior Art

It is known to have roadside lighting and information bearing panels supported by sectional posts having one or more breakaway couplings interconnection the post sections and that yield upon impact. The breakaway couplings are provided in an attempt to reduce injuries and vehicle damage when the structure is impacted by a vehicle. By way of example reference may be had to the following United States Patents: U.S. Pat. No. 4,926,592 issued May 22, 1990 to C. G. Nehls, U.S. Pat. No. 6,488,268 issued Dec. 3, 2002 to J. R. Albritton, U.S. Pat. No. 6,422,783 issued Jul. 23, 2002 to H. M. Jordan, U.S. Pat. No. 5,481,835 issued Jan. 9, 1996 to J. A. Bloom, U.S. Pat. No. 6,540,196 issued Apr. 1, 2003 to S. J. Ellsworth.

U.S. Pat. No. 5,481,835 discloses a tubular highway lamp post with an upper and lower pair of spaced apart break away portions with the lower one being at the base of the post.

A road side sign panel supported by multiple posts each with two break away sections spaced apart from one another along the respective posts is disclosed in the following U.S. Pat. No. 4,071,970 issued n Feb. 7, 1978 to R. A. Strizki.

Other known post slip type couplings have the components thereof permanently attached to the post sections as for example by welding and in the event of damage to the post not only do the post sections need to be replaced but also the coupling members connecting the same.

It is common to see a plurality of stabs or rebar type members projecting upwardly from the ground for supporting sign posts held therein between.

SUMMARY OF THE INVENTION

The present invention provides means for quick repair and replacement of break away posts that are used alongside roadways supporting for example a panel having information for motorists and more particularly to a sectional post for such usage and having first and second slip type break-away couplings spaced apart from one another longitudinally along the post with the direction of slip of the lower coupling being in a direction across the length of the post and that of the upper in a direction lengthwise of the post and to an improved post breakaway coupling.

An object of the present invention is to provide a sectional post for use along roadsides in which the post has at least two slip type couplings spaced apart from one another longitudinally along the post with the direction of slip movement of the respective couplings being angularly disposed with respect to one another.

A further object of the present invention is to provide a sectional I beam post for use along roadsides in which there are two or more slip type couplings spaced apart from one another longitudinally along the post.

A further object of the present invention is to provide a post for roadside use having one or more slip type couplings interconnecting sections thereof in which components of the coupling are separate elements that are detachably secured to the post section associated therewith.

In keeping with the foregoing there is provided in accordance with one aspect of the present invention a sectional post for use along a road side, with the post having a first elongate lower section securable via a slip type coupling to a base anchored in the ground and in which the direction of slip movement of such coupling is in a direction across the length of the post. Also included is a second elongate upper section and a second slip type coupling detachably interconnecting the first and second sections in end-to-end relation and wherein the direction of slip movement of the second coupling is in a direction lengthwise of the post.

In accordance with another aspect of the present invention there is provided a post for use along a roadside. The post comprises a first lower I-beam post section, a second intermediate I-beam post section, and a first slip type coupling means interconnecting said post sections in end-to-end relation. The first coupling means comprises a first and second lower and upper pair of L-shaped brackets removably secured respectively to the lower and intermediate post sections. The pairs of brackets have legs thereof in face-to face relation in a horizontal plane proximate abutting ends of the post sections with each such bracket having notches in a free outer end thereof remote from the post, bolt and nut units interconnecting said pairs of brackets with the bolt portion thereof passing through a notch in an upper one of the brackets that is aligned with a notch in the lower bracket. The notches permit slip in which the slip movement is in a direction across the length of the post. Included also is an upper post section and a second slip type coupling means interconnecting the intermediate and upper sections in end-to-end relation and wherein slip movement of the second coupling is in a direction lengthwise of the post.

Other objects, features, and advantages of the invention will be apparent with the following detailed description taken in conjunction with the accompanying drawings showing a preferred embodiment of the invention and appended claims.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 1 is an oblique view of an I-beam post anchored in the ground and in which the post is composed of post sections interconnected end-to-end by two spaced apart slip type couplings;

FIG. 2 is an oblique view of the sectional post shown in FIG. 1;

FIG. 3 is an exploded oblique view of the post showing the individual components;

FIG. 6 is an oblique view illustrating the a somewhat modified lower slip coupling.

DETAILED DESCRIPTION OF THE PREFERRED EMBODIMENT

Figure 4:
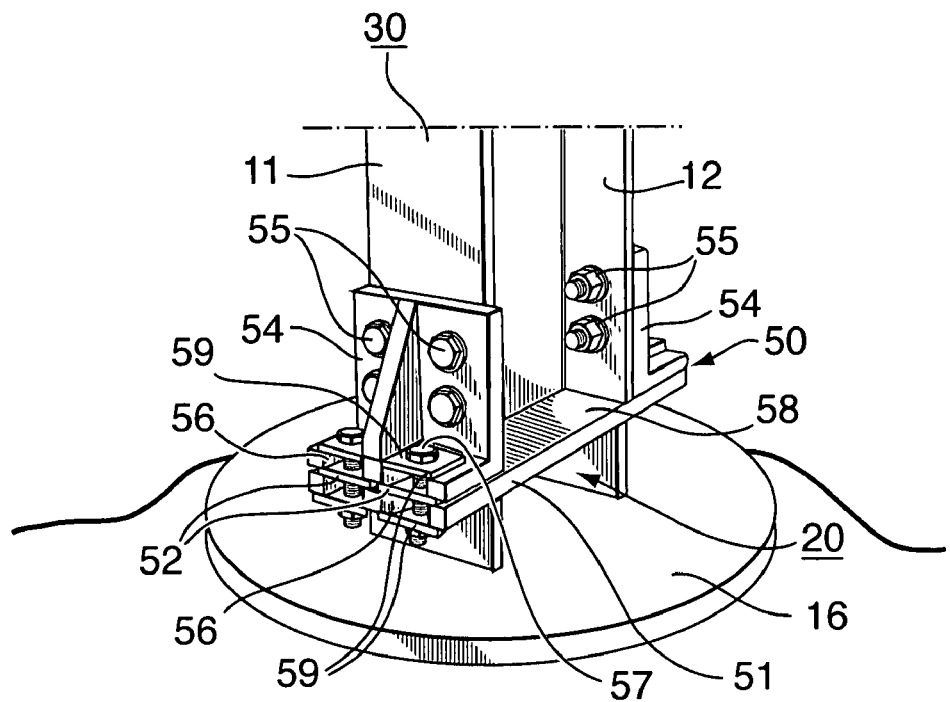
FIG. 4 is an oblique view, on a larger scale, of the ground anchored base portion and lower slip type coupling connecting the post to the base.
Figure 5:
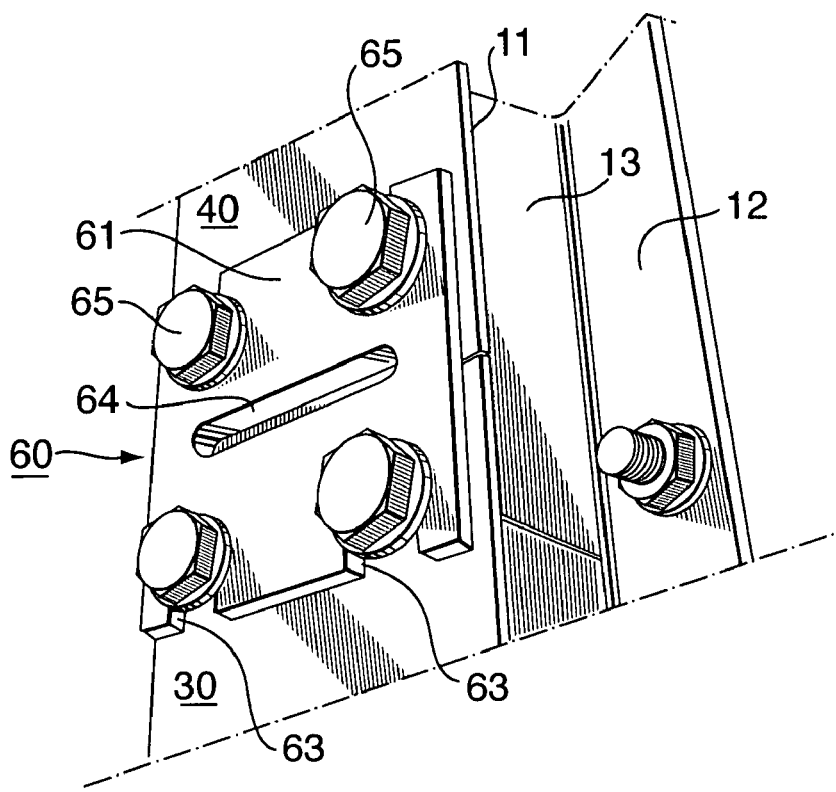
FIG. 5 is an oblique view, on a larger scale, of a portion of the post showing the upper slip type coupling interconnection the upper and intermediate post sections.

Illustrated in the drawings is a post 10 having a member 15 mounted thereon. The member 15 is shown in broken line and is representative on any one of a panel that bears information along a roadway for motorists or lighting. It is to be understood applicants post can have many different use applications that may require one or more posts.

The post 10 is preferably made from wide flange I-beam elongate sections that have spaced apart flanges 11, 12 interconnected by a web 13. The post comprises a base section 20, an intermediate section 30 and an upper section 40 with such post sections being connected in end-to-end relation by first and second respective lower and upper breakaway couplings 50 and 60.

In FIG. 1 the base section 20 is shown partially embedded in concrete 16 in the ground and has a portion projecting upwardly therefrom terminating at the upper end in a horizontally disposed plate 51 (as best shown in FIGS. 3 and 4) that is fixedly secured thereto. The plate 51 projects. beyond the respective flanges 11, 12 of the I-beam and has a first spaced apart pair of notches 52 in one end thereof and a second spaced apart pair of notches 53 in the other end opposite to said one end.

The intermediate post section 30 has four holes 31 in each of the flanges 11, 12 proximate the lower end thereof and two holes 32 proximate the opposite upper end. One L-shaped bracket 54 is secured by four bolt and nut units 55 to the flange 11 and another bracket 54 is similarly secured to the flange 12. Each bracket 54 has four holes in one leg thereof and a pair of spaced apart notches 56 in the other leg. The notches 56 in the pair of brackets 54 align with the notches 52, 53 in the plate 51 for receiving a respective one of four bolt and nut units 57. These bolt and nut units 57 are suitably positioned by holes disposed in predetermined locations in a plate 58 that is positioned between the lower end of the post section 30 and the plate 51 on the base section 20.

As seen in FIG. 4 there are two washers 59 on each bolt of the bolt and nut units 57 with one washer overlying the notch 56 in the bracket 54 and the other underlying the notch 52, or 53 as the case maybe, associated therewith in the plate 51. If desired two brackets 54, as illustrated in FIG. 6, can connected to the base post section 20 to replace the above described plate 51 thereby permitting ready replacement of any one of the components that makes up the slip coupling 50.

The upper slip coupling 60 is provided by a pair of plates 61 one being on the outer face of the flange 11 and the other on the outer face of flange 12. Each plate has two holes disposed adjacent one end thereof and a pair of spaced apart notches 63 extending inwardly from the opposite end of the plate. The upper post section 40 has two spaced apart bolt receiving holes 41 adjacent the lower end thereof and two bolt and nut units 65 attach one plate 61 to flange 11 of the upper post section 40 and similarly the second plate 61 is to the flange 12. The pair of plates project downwardly from the upper post section and overlap an upper portion of the post section 30. The notches 63 in the pair of plates 61 are disposed in preselected alignment with the bolt holes 32 in the upper end of the post intermediate section 30 and have the bolt portion of bolt and nut units 67 pass there through.

Each plate preferably has a line of weakness approximately mid-distance between the holes and the notches 63 and this line of weakness is provided in the preferred embodiment by a slot 64 in the plate The two holes in the plate and the holes 41 in the post section are preferably so located as to position the line of weakness in the plate in a plane that passes approximately between the adjacently disposed abutting ends of the post sections 30,40.

The amount by which the bolt and nut units 57, 67 are tightened predetermines the amount of force required to break the respective couplings 50 and 60. The coupling 60 can be partially broken by having the notches 63 disengage from the bolt and nut units 67 on flange 11 or on flange 12 but not on the other. In such instance the line of weakness in the plate that remains connected to the post section 30 provides a hinge allowing the upper post section 40 to become angularly disposed with respect to the intermediate post section 30. Complete breakage of the coupling 60 occurs when the notches 63 in both plates become disengaged from the bolt and nut units 67 associated therewith.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

The invention claimed is:

1. A post for use along a roadside comprising:
   a first post section securable via a first slip type coupling means to a base section anchored in the ground and in which the slip movement of said first slip type coupling means is in a direction across the length of said post;
   a second post section;
   said first post section and said second post section comprise elongate I-beam sections having opposing outer faces;
   a second slip type coupling means interconnecting said first post section and said second post section in end-to-end relationship wherein slip movement of said second post section coupling is in a direction lengthwise of said post;
   said second coupling means comprises a pair of plates located one on each of respective outer faces of the flanges of the I-beams, means securely removably anchoring a portion of the respective plates to the post flange associated therewith of one post section and slip joint means connecting another portion of said plates to the flange associated therewith of the other adjacently disposed post section and wherein said first coupling means includes a pair of L-shaped brackets, means removably securing one leg of the respective brackets to respective ones of the flanges of the lower end of the lower post section with the other leg projecting outwardly away from the post flange associated therewith, each of said projecting bracket leg having at least one notch in a free outer edge, and bolt and nut units on said base section having the bolt thereof passing through said notches and thereby permitting slippage.

2. The post as defined in claim 1 wherein said first coupling means includes a pair of L-shaped brackets, means removably securing one leg of the respective brackets to respective ones of the flanges of the lower end of the lower post section with the other leg projecting outwardly away from the post flange associated therewith, each of said projecting bracket leg having at least one notch extending inwardly from a free outer edge thereof and bolt and nut units on said base section having the bolt thereof passing through said notches and thereby permitting slippage of the coupling.

3. The post as defined in claim 2 wherein said notches are located in a free outed end of the bracket associated therewith.

4. A post for use along a roadside, said post comprising:
   a first lower I-beam post section, a second intermediate I-beam post section, a first slip type coupling means interconnecting said post sections in end-to-end relation, said first coupling means comprising a first and second lower and upper pair of L-shaped brackets removably secured respectively to said lower and intermediate post sections, said pairs of brackets having legs thereof in face-to face relation in a horizontal plane proximate abutting ends of said post sections, each such bracket having notches in a free outed end thereof remote from the post, bolt and nut units interconnecting said pairs of bracket with the bolt portion thereof passing though a notch in an upper one of the brackets that is aligned with a notch in the lower bracket, said notches permitting slip in which the slip movement is in a direction across the length of the post;

an upper post section;

a second slip type coupling means interconnecting said intermediate and upper sections in end-to-end relation and wherein slip movement of said second coupling is in a direction lengthwise of the post;

said second coupling means comprises a pair of plates located one on each of respective outer faces of the flanges of the I-beams, means securely removably anchoring a portion of the respective plates to the post flange associated therewith of one post section and slip joint means connecting another portion of said plates to the flange associated therewith of the other adjacently disposed post section and wherein said first coupling means includes a pair of L-shaped brackets, means removably securing one leg of the respective brackets to respective ones of the flanges of the lower end of the lower post section with the other leg projecting outwardly away from the post flange associated therewith, each of said projecting bracket leg having at least one notch in a free outer edge, and bolt and nut units on said base section having the bolt thereof passing through said notches and thereby permitting slippage.

* * * * *